US011662887B2

(12) United States Patent
Rajaraman et al.

(10) Patent No.: US 11,662,887 B2
(45) Date of Patent: *May 30, 2023

(54) ADAPTIVE CONTENT CONTROL AND DISPLAY FOR INTERNET MEDIA

(71) Applicant: Google LLC, Mountain View, CA (US)

(72) Inventors: Shivakumar Littoo Rajaraman, San Francisco, CA (US); Stein Eldar Johnsen, Adliswil (CH); Jonas Yngvesson, Binz (CH); Jasmine Kent, Zurich (CH); Elena Kaschner, Thalwil (CH); Jun Li, Zurich (CH); Matias Cudich, San Francisco, CA (US); Thomas Robinson Purnell-Fisher, San Bruno, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,728

(22) Filed: Aug. 5, 2022

(65) Prior Publication Data

US 2022/0385983 A1    Dec. 1, 2022

Related U.S. Application Data

(63) Continuation of application No. 16/229,669, filed on Dec. 21, 2018, now abandoned, which is a (Continued)

(51) Int. Cl.
*G06F 3/0482*    (2013.01)
*G06F 16/00*    (2019.01)
(Continued)

(52) U.S. Cl.
CPC .......... *G06F 3/0482* (2013.01); *G06F 3/0484* (2013.01); *G06F 3/04847* (2013.01);
(Continued)

(58) Field of Classification Search
CPC .................................................. G06F 3/048–05
See application file for complete search history.

(56) References Cited

U.S. PATENT DOCUMENTS 5,539,479 A    7/1996 Bertram
5,602,597 A    2/1997 Bertram
(Continued)

OTHER PUBLICATIONS

Apong et al., "Samsung LN70A650A 40-inch LCD HDTV Review", last accessed Mar. 16, 2009, pp. 1-4, available at: http://www/pcstats.com/articleview.cfm?articleid=2378&page=4.
(Continued)

*Primary Examiner* — Daniel Rodriguez
(74) *Attorney, Agent, or Firm* — Byrne Poh LLP

(57) ABSTRACT

This disclosure relates to adaptive content control and display for internet media. A playback component provides for playback of media content. An input component detects user inputs during playback of the content. In response to the user inputs being detected, a menu component displays a level of a pivot menu during playback of the content. The pivot menu is displayed on top, or in front, of a portion of the content during playback, and the pivot menu can be at least partially transparent to enable consumption of the content to continue without complete obstruction.

21 Claims, 11 Drawing Sheets

US 11,662,887 B2

Page 2

Related U.S. Application Data continuation of application No. 15/216,484, filed on Jul. 21, 2016, now Pat. No. 10,162,487, which is a continuation of application No. 13/546,987, filed on Jul. 11, 2012, now Pat. No. 9,423,925.

(51) Int. Cl.

| | |
|---|---|
| *G06F 16/44* | (2019.01) |
| *H04L 65/613* | (2022.01) |
| *G06F 3/0484* | (2022.01) |
| *H04N 21/482* | (2011.01) |
| *G06F 3/04847* | (2022.01) |
| *H04L 65/60* | (2022.01) |

(52) U.S. Cl.
CPC .............. *G06F 16/00* (2019.01); *G06F 16/44* (2019.01); *H04L 65/60* (2013.01); *H04L 65/613* (2022.05); *H04N 21/4825* (2013.01)

(56) References Cited

U.S. PATENT DOCUMENTS

| | | |
|---|---|---|
| 5,606,374 A | 2/1997 | Bertram |
| 5,657,091 A | 8/1997 | Bertram |
| 6,011,546 A | 1/2000 | Bertram |
| 6,684,240 B1 | 1/2004 | Goddard |
| 6,976,216 B1* | 12/2005 | Peskin ................. H05K 999/99 345/169 |
| 7,313,808 B1* | 12/2007 | Gupta ............ H04N 21/440245 725/135 |
| 7,634,739 B2* | 12/2009 | McCrossan .......... G11B 27/309 715/810 |
| 8,069,414 B2 | 11/2011 | Hartwig et al. |
| 8,291,452 B1 | 10/2012 | Yong et al. |
| 8,490,022 B2* | 7/2013 | Stone ................. G11B 27/105 715/854 |
| 2001/0043789 A1* | 11/2001 | Nishimura ........... H04N 5/9206 386/E5.025 |
| 2002/0078467 A1* | 6/2002 | Rosin ................. H04N 21/4622 348/E7.071 |
| 2002/0120925 A1* | 8/2002 | Logan .................... A61Q 19/00 725/135 |
| 2003/0093790 A1* | 5/2003 | Logan .................. H04N 21/6125 348/E7.071 |
| 2003/0151621 A1 | 8/2003 | McEvilly et al. |
| 2004/0128317 A1* | 7/2004 | Sull ....................... G06F 16/743 |
| 2005/0018050 A1* | 1/2005 | Yaji ....................... G06Q 10/107 348/E7.078 |
| 2005/0028191 A1 | 2/2005 | Sullivan et al. |
| 2005/0091597 A1* | 4/2005 | Ackley .............. H04N 21/4622 715/717 |
| 2005/0257169 A1* | 11/2005 | Tu .......................... G06F 3/0481 715/810 |
| 2006/0064716 A1* | 3/2006 | Sull ...................... G06F 16/784 715/201 |
| 2006/0104016 A1 | 5/2006 | Jang et al. |
| 2006/0248475 A1* | 11/2006 | Abrahamsson .... H04N 21/4312 345/157 |
| 2007/0014404 A1* | 1/2007 | Cha .................... H04N 21/4344 380/201 |
| 2007/0028183 A1* | 2/2007 | Ostojic .............. H04N 21/4438 348/E7.071 |
| 2007/0052725 A1 | 3/2007 | Ostojic et al. |
| 2007/0083911 A1 | 4/2007 | Madden et al. |
| 2007/0133607 A1* | 6/2007 | Park .................... H04N 21/4325 370/468 |
| 2007/0136681 A1* | 6/2007 | Miller ................. G06F 3/04847 715/782 |
| 2007/0139443 A1* | 6/2007 | Marks ................ H04N 21/4331 |
| 2007/0162853 A1 | 7/2007 | Weber et al. |
| 2007/0162936 A1 | 7/2007 | Stallings et al. |
| 2007/0189737 A1 | 8/2007 | Chaudhuri et al. |
| 2007/0214488 A1* | 9/2007 | Nguyen ................ G06F 16/78 725/135 |
| 2007/0229465 A1 | 10/2007 | Sakai et al. |
| 2007/0256021 A1* | 11/2007 | Prager .................... H04H 60/66 715/744 |
| 2008/0062127 A1* | 3/2008 | Brodersen ........ H04N 21/47217 345/158 |
| 2008/0066003 A1 | 3/2008 | Vong |
| 2008/0066135 A1* | 3/2008 | Brodersen ............. G11B 27/105 725/63 |
| 2008/0134097 A1* | 6/2008 | Uchimura ........ H04N 21/23614 707/999.102 |
| 2008/0141135 A1* | 6/2008 | Mason ................. G11B 27/034 707/999.1 |
| 2008/0222546 A1* | 9/2008 | Mudd .................... H04N 21/482 715/764 |
| 2008/0276278 A1 | 11/2008 | Krieger et al. |
| 2009/0024923 A1* | 1/2009 | Hartwig ................. G06F 16/70 715/716 |
| 2009/0024927 A1* | 1/2009 | Schrock ................ H04L 67/306 715/722 |
| 2009/0083260 A1 | 3/2009 | Artom et al. |
| 2009/0165048 A1* | 6/2009 | Nishimura ............. H04N 21/47 725/39 |
| 2009/0187859 A1 | 7/2009 | Tuerk et al. |
| 2009/0195696 A1* | 8/2009 | McDaniel ........... H04N 21/4622 348/570 |
| 2009/0210792 A1* | 8/2009 | Proehl ............... H04N 21/42204 715/720 |
| 2009/0245803 A1* | 10/2009 | Garner .............. H04N 21/42204 398/106 |
| 2010/0070523 A1* | 3/2010 | Delgo ................... G06F 16/743 707/769 |
| 2010/0122163 A1* | 5/2010 | Goldberg ............... G06Q 30/02 715/705 |
| 2010/0128802 A1* | 5/2010 | Shih ..................... H04N 7/0806 375/E7.267 |
| 2010/0153846 A1* | 6/2010 | Roy ...................... G06F 16/639 715/716 |
| 2010/0293190 A1 | 11/2010 | Kaiser et al. |
| 2010/0323334 A1 | 12/2010 | Goforth et al. |
| 2010/0325683 A1 | 12/2010 | Karaoguz et al. |
| 2011/0145708 A1 | 6/2011 | Bhogal et al. |
| 2011/0211808 A1* | 9/2011 | Ryu ..................... H04N 21/4825 386/234 |
| 2011/0242002 A1* | 10/2011 | Kaplan ................ G06F 3/04883 345/173 |
| 2011/0246560 A1* | 10/2011 | Gibson ................ G11B 27/105 709/203 |
| 2011/0246945 A1 | 10/2011 | Caine et al. |
| 2011/0264676 A1* | 10/2011 | Belan ................... G06F 16/743 707/756 |
| 2012/0042247 A1* | 2/2012 | Harper ................. G06Q 30/02 709/225 |
| 2012/0042250 A1 | 2/2012 | Hartwig et al. |
| 2012/0060088 A1* | 3/2012 | Hill .................... G06F 3/0484 715/702 |
| 2012/0060092 A1* | 3/2012 | Hill ................... H04N 21/4312 715/716 |
| 2012/0077175 A1* | 3/2012 | Levisay ................ G09B 5/06 715/721 |
| 2012/0079385 A1 | 3/2012 | Ellis et al. |
| 2012/0151342 A1 | 6/2012 | Trotta et al. |
| 2012/0151390 A1 | 6/2012 | Trotta et al. |
| 2012/0198339 A1* | 8/2012 | Williams ............. H04L 65/613 715/727 |
| 2012/0221951 A1* | 8/2012 | Kidron ............... G06Q 30/0222 715/716 |
| 2012/0236201 A1* | 9/2012 | Larsen ................. H04N 21/242 348/468 |
| 2012/0274863 A1* | 11/2012 | Chardon .............. G06F 3/04886 348/734 |
| 2012/0278764 A1* | 11/2012 | Arriola ................. G06F 16/44 715/835 |
| 2012/0284266 A1* | 11/2012 | Chandraghatgi ...... G06F 16/951 707/E17.089 |
| 2013/0031162 A1 | 1/2013 | Willis et al. |
| 2013/0031208 A1 | 1/2013 | Linton et al. |

(56) References Cited

U.S. PATENT DOCUMENTS

| | | | |
|---|---|---|---|
| 2013/0041862 A1 | 2/2013 | Yang et al. | |
| 2013/0047083 A1* | 2/2013 | Sansom | G06F 16/735 |
| | | | 715/764 |
| 2013/0067527 A1 | 3/2013 | Ashbrook et al. | |
| 2013/0132904 A1 | 5/2013 | Primiani et al. | |
| 2013/0174194 A1 | 7/2013 | Mooneyham | |
| 2013/0239163 A1 | 9/2013 | Kim et al. | |
| 2013/0283185 A1* | 10/2013 | Mock | H04N 7/15 |
| | | | 715/746 |
| 2013/0290848 A1 | 10/2013 | Billings et al. | |
| 2015/0089371 A1* | 3/2015 | Zaslavsky | G06F 3/0482 |
| | | | 715/716 |
| 2015/0189388 A1 | 7/2015 | Devassykutty et al. | |

OTHER PUBLICATIONS

Gayle, M., "Free Site Idea: Controversial YouTube Videos", last updated May 17, 2011, pp. 1-3, available at: http://marcgayle.com/2011/05/17/free-site-idea-controversial-youtube-videos/.

Notice of Allowance dated Apr. 13, 2016 in U.S. Appl. No. 13/546,987.
Notice of Allowance dated Aug. 16, 2018 in U.S. Appl. No. 15/216,484.
Office Action dated Jan. 6, 2014 in U.S. Appl. No. 13/546,987.
Office Action dated Jan. 13, 2021 in U.S. Appl. No. 16/229,669.
Office Action dated Jan. 18, 2022 in U.S. Appl. No. 16/229,669.
Office Action dated Mar. 3, 2020 in U.S. Appl. No. 16/229,669.
Office Action dated May 5, 2022 in U.S. Appl. No. 16/229,669.
Office Action dated May 19, 2014 in U.S. Appl. No. 13/546,987.
Office Action dated Jun. 18, 2021 in U.S. Appl. No. 16/229,669.
Office Action dated Aug. 5, 2014 in U.S. Appl. No. 13/546,987.
Office Action dated Aug. 18, 2020 in U.S. Appl. No. 16/229,669.
Office Action dated Sep. 10, 2015 in U.S. Appl. No. 13/546,987.
Office Action dated Oct. 7, 2021 in U.S. Appl. No. 16/229,669.
Office Action dated Oct. 11, 2019 in U.S. Appl. No. 16/229,669.
Office Action dated Dec. 18, 2014 in U.S. Appl. No. 13/546,987.
Pinoytutorial, "Youtube LeanBack Review: How to Use Youtube LeanBack?", last accessed Jul. 10, 2010, one page, available at: http://pinoytutorial.com/techtorial/youtube-leanback-review/.

* cited by examiner

ADAPTIVE CONTENT CONTROL AND DISPLAY FOR INTERNET MEDIA

CROSS-REFERENCE TO RELATED APPLICATIONS

This application is a continuation of U.S. patent application Ser. No. 16/229,669, filed Dec. 21, 2018, which is a continuation of U.S. patent application Ser. No. 15/216,484, filed Jul. 21, 2016,which is a continuation of U.S. patent application Ser. No. 13/546,987, filed Jul. 11, 2012, each of which is hereby incorporated by reference herein in its entirety.

TECHNICAL FIELD

This disclosure generally relates to systems and methods that facilitate adaptive content control and display for internet media

BACKGROUND

The internet and media enabled portable computing devices have dramatically altered the processes for generating and consuming media content. Presently, users can consume media content virtually anywhere at any time, as long as they have access to a media capable device with an internet connection. The convenience of being able to view media content via the internet, essentially on demand, has resulted in explosive growth of internet media consumption. Internet media traffic is currently approaching a majority of consumer internet traffic, and the rate of demand is projected to continue increasing.

The sheer quantity of media content available to users can make selecting content for consumption challenging. Millions of people around the world have the capability to produce media content, and popular online services can receive tens of hours worth of newly uploaded user-generated content every minute. In addition, traditional media outlets now have the ability to enable consumers to access large archives containing older media content and newly generated content. Users may overlook available content well suited to their individual preferences, because of the inability to locate or identify the content.

User engagement with online content services commonly includes a cycle of search, discover, and play. Additionally, some services enable users to save or track previously discovered content via favorites lists, watch pages, and/or subscriptions. However, due to the large quantity of media content available, searching for and discovering content can be a tedious, difficult, and time consuming process. As a result, users are often not provided with an optimum user and/or viewing experience.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for adaptive content control and display for internet media are disclosed. During playback of media content, user inputs are detected. As a function of the user inputs, a level of a pivot menu is displayed. The user can direct playback of the content and discover or select additional content to consume using the pivot menu, during playback of the content. The levels of the pivot menu include a player controls level, an information and ratings level, a related media level, a playlist level, and/or a channel level.

In one embodiment, a playback component provides for playback of content, an input component detects a first user input during playback of the content, and in response to the first user input being detected, a menu component displays a next level of a pivot menu during playback of the content.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
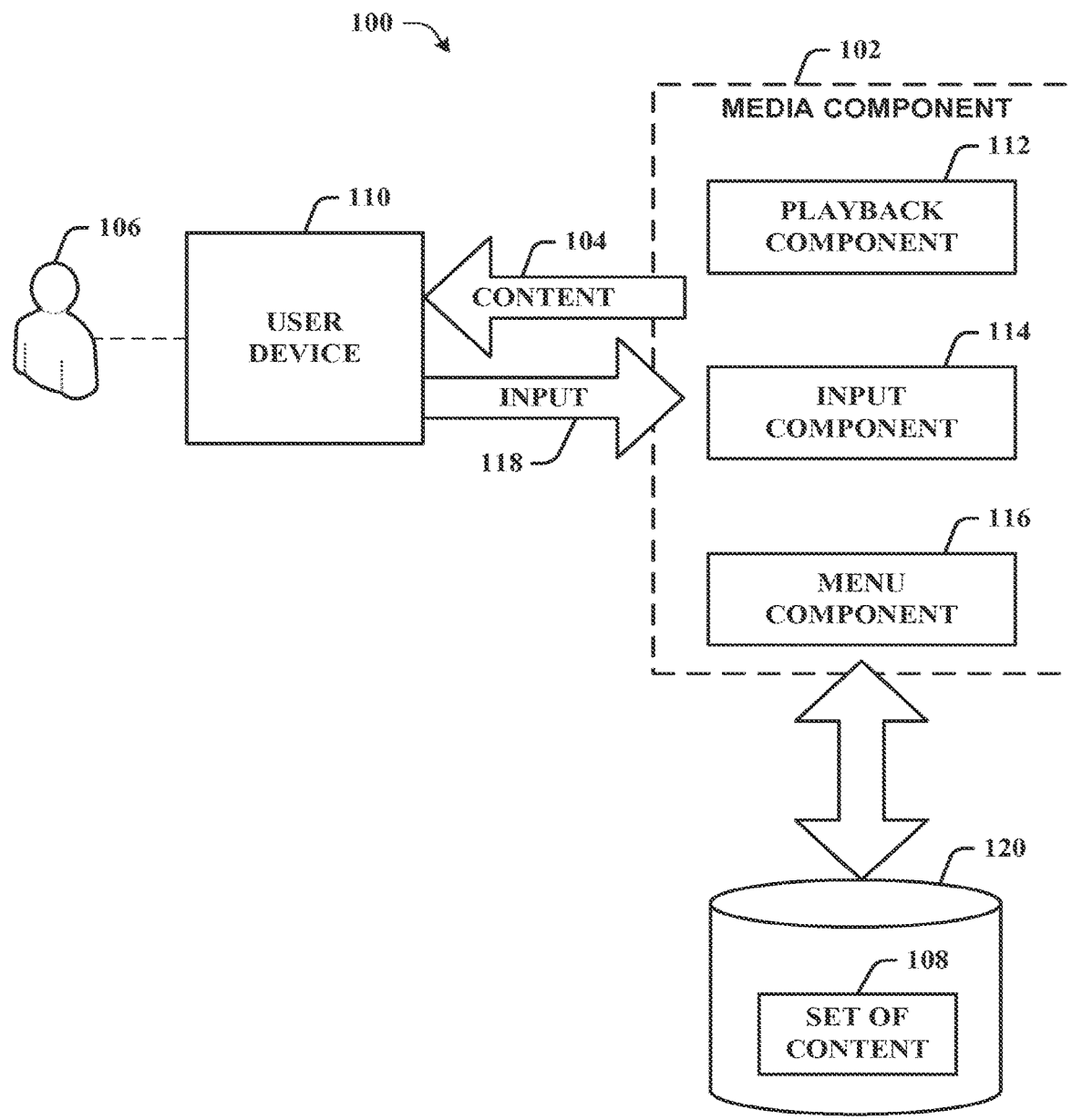
FIG. 1 illustrates an example system for adaptive content control and display for internet media in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, user engagement with online content services commonly includes a cycle of search, discover, and play. Due to the large quantity of media content available, searching for and discovering content can be a tedious, difficult, and time consuming process. As a result, users are often not provided with an optimum user or viewing experience. One non-limiting implementation of the innovation provides for users to direct playback of content, and discover or select additional content to consume using a pivot menu during playback of the content.

More particularly, in accordance with an embodiment, a playback component provides for playback of content, an input component detects a first user input during playback of the content, and in response to the first user input being detected, a menu component displays a next level of a pivot menu during playback of the content.

Non-Limiting Examples of Systems for Adaptive Content Control and Display for Internet Media Turning now to FIG. 1, illustrated is an example system 100 for adaptive content control and display for internet media in accordance with various aspects described in this disclosure. Generally, system 100 can include a memory that stores computer executable components and a processor that executes computer executable components stored in the memory, examples of which can be found with reference to FIG. 11. System 100 includes a media component 102. The media component 102 publishes, streams, or otherwise provides media content 104 (content 104) to a user 106. For example, in one implementation, the media component 102 provides content included in a set of content 108 to a user device 110 associated with the user 106 via a network connection. The content 104 includes but is not limited to videos, music, electronic books (e-books), video games, websites, and/or articles. The user device 110 can include but is not limited to a smart phone, a cell phone, a personal digital assistant (PDA), a tablet, a laptop, a desktop, a portable music player, a video game system, an electronic reader (e-reader), a global positioning system (GPS), a set-top box, and/or a television. The media component 102 includes a playback component 112, an input component 114, and a menu component 116. It is to be appreciated that although the media component 102 is illustrated as being a stand-alone component, such implementation is not so limited. For example, the media component 102 can be included in a content server, a user device (e.g., user device 110), a multimedia player, and so forth.

The playback component 112 provides for display, presentation, or what is referred to for the purposes of this disclosure as playback of the content 104 via the user device 110. For example, in one embodiment, the user 106 can select an internet video to stream using the media component 102, and the playback component 112 provides for displaying the streaming internet video to the user device 110. Aspects of the invention are not limited to a particular display of the content 104, and the display can be adapted based on the user device 110 and/or content 104. It is to be appreciated that although the set of content 108 is illustrated as being included in a data store 120, such implementation is not so limited. For example, the set of content 108 can be included in the media component 102, the user device 110, and/or in another location, wherein the media component 102 may access the set of content 108, e.g., via a network connection.

The input component 114 detects, determines, or otherwise receives input 118 from the user 106 (e.g., via the user device 110) during playback of the content 104. The input can include explicit user inputs (e.g., configuration selections, question/answer, etc.) such as from mouse selections, keyboard entries, touch screen selections, and/or speech. For example, in one implementation, the input component 114 detects keyboard commands entered by the user 106, via the user device 110, during playback of a streaming video.

The menu component 116 exposes, presents, otherwise displays levels of a pivot menu during playback of the content 104 in response to inputs (e.g., input 118) detected by the input component 114. For example, in one implementation, in response to a first input being detected, the menu component 116 displays a first level of a pivot menu during playback of the content 104, in response to a second input being detected, the menu component 116 displays a second level of the pivot menu during playback of the content 104, and so forth. The pivot menu is displayed without interrupting playback of the content 104. For example, in one implementation, the pivot menu can be displayed while playback of the content 104 continues, such that the content 104 can still be consumed. For instance, the pivot menu can be displayed on top, or in front, of a portion of the content 104 during playback, and the pivot menu can be at least partially transparent to enable consumption of the content 104 to continue without complete obstruction.

Figure 2:
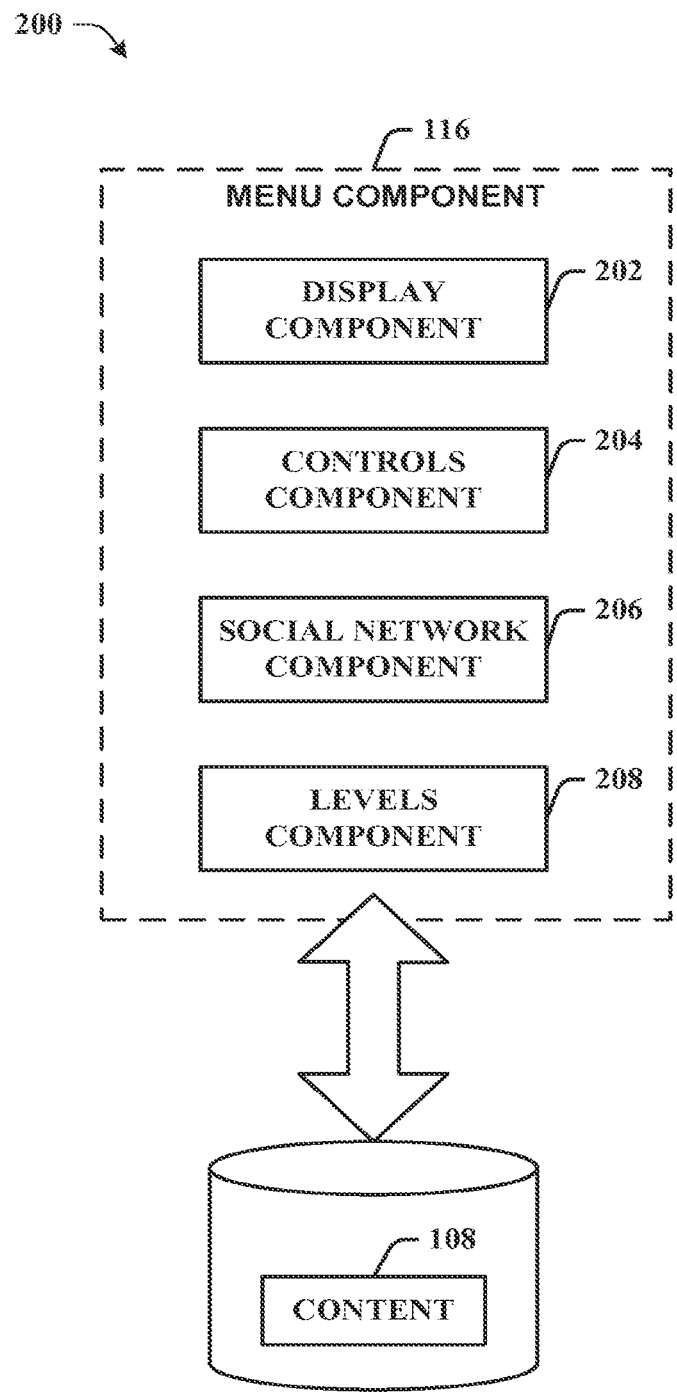
FIG. 2 illustrates an example an example menu component in accordance with various aspects described in this disclosure.

FIG. 2 illustrates an example menu component 116 in accordance with various aspects described in this disclosure. As discussed, the menu component 116 displays levels of a pivot menu during playback of content 104 in response to inputs (e.g., input 118) detected by an input component 114. The menu component 116 in FIG. 2 includes a display component 202, a controls component 204, a social network component 206, and a levels component 208. The display component 202 presents, generates, or otherwise provides a display of the pivot menu during playback of content 104. Aspects of the invention are not limited to a particular display of the pivot menu. For instance, the pivot menu can be displayed on top, or in front, of a portion of the content 104 during playback, and the pivot menu can be at least partially transparent to enable consumption of the content 104 to continue without complete obstruction. Additionally or alternatively, the pivot menu can be displayed adjacent to the content 104 during playback. The controls component 204 provides various adapters, connectors, channels, communication paths, etc., that provide for interaction with the pivot menu. Interaction with the pivot menu includes but is not limited to scrolling through menu items, highlighting menu items, and/or selecting menu items via touch screen, keyboard, speech, and/or mouse inputs.

The social network component 206 provides various adapters, connectors, channels, communication paths, etc. to integrate menu items included in the pivot menu into virtually any social networking platform. For example, in one embodiment, a level of the pivot menu can include a set of social networking menu items that enable users (e.g., user 106) to execute a set of user actions associated with a social network during playback of the content 104, and the social network component 206 can automatically link the user actions with a corresponding social networking platform. For instance, the set of actions can include but are not limited to providing positive feedback (e.g., +1™, etc.) regarding the content 104, commenting on the content 104, and/or sharing content 104 with a user's social network during playback of the content 104.

The levels component 208 provides the levels of the pivot menu for display by the display component 202. In addition, the levels component 208 organizes, populates, or otherwise generates a subset of the levels for the pivot menu. For example, in one embodiment, a first subset of the levels can be predetermined, and a second subset of the levels can be dynamically generated or populated via the levels component 208. For instance, the pivot menu can include a related media content level, and the levels component 208 can populate the related media content level with a subset of the content 108 that satisfies a set of relatedness criteria (discussed in greater detail with reference to FIG. 3).

Figure 3:
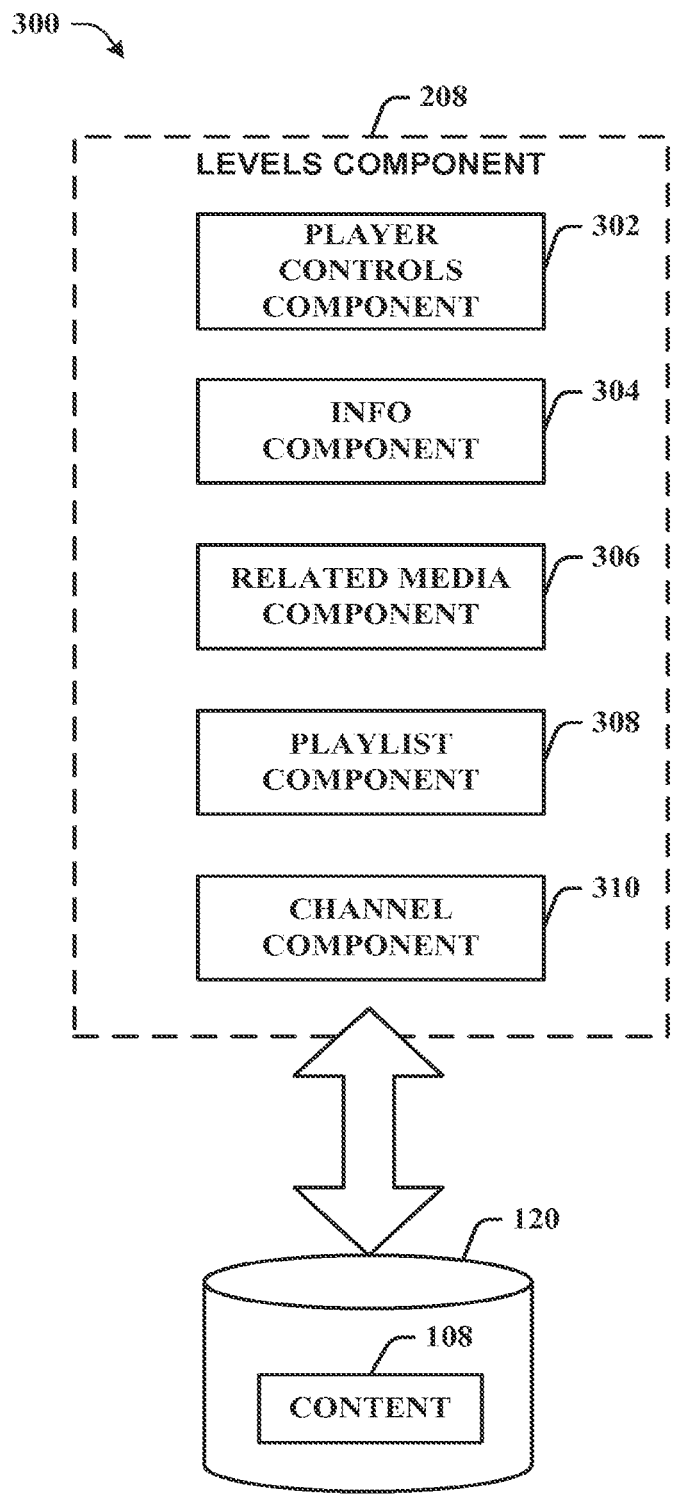
FIG. 3 illustrates an example levels component in accordance with various aspects described in this disclosure.

Referring to FIG. 3, illustrated is an example levels component 208 in accordance with various aspects described in this disclosure. As discussed, the levels component 208 provides the levels of the pivot menu for display by a display component 202. The levels component 208 in FIG. 3 includes a player controls component 302, an information component 304, a related media component 306, a playlist component 308, and a channel component 310. The player controls component 302 provides a level of the pivot menu (player controls level) that includes a set of media player controls (player controls). The set of player controls can include but are not limited to rewind to the beginning of content, fast rewind, pause, play, fast forward, forward to end the of content, express approval (e.g., approve, enjoyed, liked, positive review, thumbs up, etc.), express disapproval of the content (e.g., disapprove, did not enjoy, disliked, negative review, thumbs down, etc.), and/or view additional information regarding content. For example, in one embodiment, in response to a first user input (e.g., a down arrow command), the set of player controls are displayed on a first level (the player controls level) of the pivot menu during playback of the content 104.

The information component 304 (info component 304) provides a level of the pivot menu (information and ratings level) that includes a set of ratings controls, and/or information regarding the content 104. The set of ratings controls provide for the user to rate content, authors, playlists, and/or channels using the pivot menu during playback of the content. The set of ratings controls can include but are not limited to approve, disapprove, social networking actions (e.g., +1™, share, comment, etc), rate the content 104 using a predetermined scale (e.g., percentage, stars, etc.), block the content 104, and/or subscribe to the content, author, playlist, and/or channel. The information regarding the content 104 can include but is not limited to title, author, age, views, duration, attributes, quantity of positive reviews received, and/or quantity of negative reviews received.

The related media component 306 determines a set of content related to the content (e.g., content 104) being consumed (related content), and includes the related content in a level of the pivot menu (related content level). For example, in one embodiment, the related media component 306 selects content from the set of content 108 that satisfies a set of relatedness criteria. The set of relatedness criteria can include but is not limited to satisfying a set of user preferences, satisfying a predetermined relatedness threshold (e.g., relatedness of 75%), and/or having a ranking based on relatedness that satisfies a predetermined relatedness ranking threshold (e.g., top 5, top 10, etc.).

The playlist component 308 determines, populates, or otherwise generates a playlist level of the pivot menu. For example, in one embodiment, the playlist component 308 determines a playlist associated with the content 104 being consumed (associated playlist), and includes other content in the associated playlist in the playlist level. Playlists can be, for example, groupings of content based on a set of factors that enable continuous play of the content included in the groupings of content. For instance, a user can create a playlist that includes a set of internet video clips, and a second user can continuously, or sequentially, consume the set of internet video clips via the playlist created by the first user. The set of factors can include but are not limited to user-generated groupings, similarity, relatedness, and/or attributes.

As an additional or alternative example, in one embodiment, the playlist component 308 determines a set of playlists related to and/or associated with the content 104 being consumed (related playlists) based on a set of playlist relatedness criteria, and includes the related playlists in the playlist level. The set of playlists relatedness criteria can include but is not limited to association with the content being consumed, inclusion of the content being consumed, satisfying a set of user preferences, satisfying a predetermined playlist relatedness threshold (e.g., relatedness of 75%), and/or satisfying a predetermined playlist relatedness ranking threshold (e.g., top 5, top 10, etc.). For instance, the playlist component 308 can select a set of playlists that include the content being consumed for inclusion in the playlist level.

The channel component 310 determines a set of channels related to and/or associated with the content 104 being consumed (related channels), and includes the related channels in a channels level of the pivot menu. The channels can include, for example, a collection of content provided by a content owner. For example, in one embodiment, the channel component 310 selects channels that satisfy a set of channel relatedness criteria. The set of channel relatedness criteria can include but is not limited to association with the content being consumed, inclusion of the content being consumed, satisfying a set of user preferences, satisfying a predetermined channel relatedness threshold (e.g., relatedness of 75%), and/or satisfying a predetermined channel relatedness ranking threshold (e.g., top 5, top 10, etc.). For instance, the channel component 310 can select a set of channels that include the content being consumed for inclusion in the channel level of the pivot menu.

Figure 4:
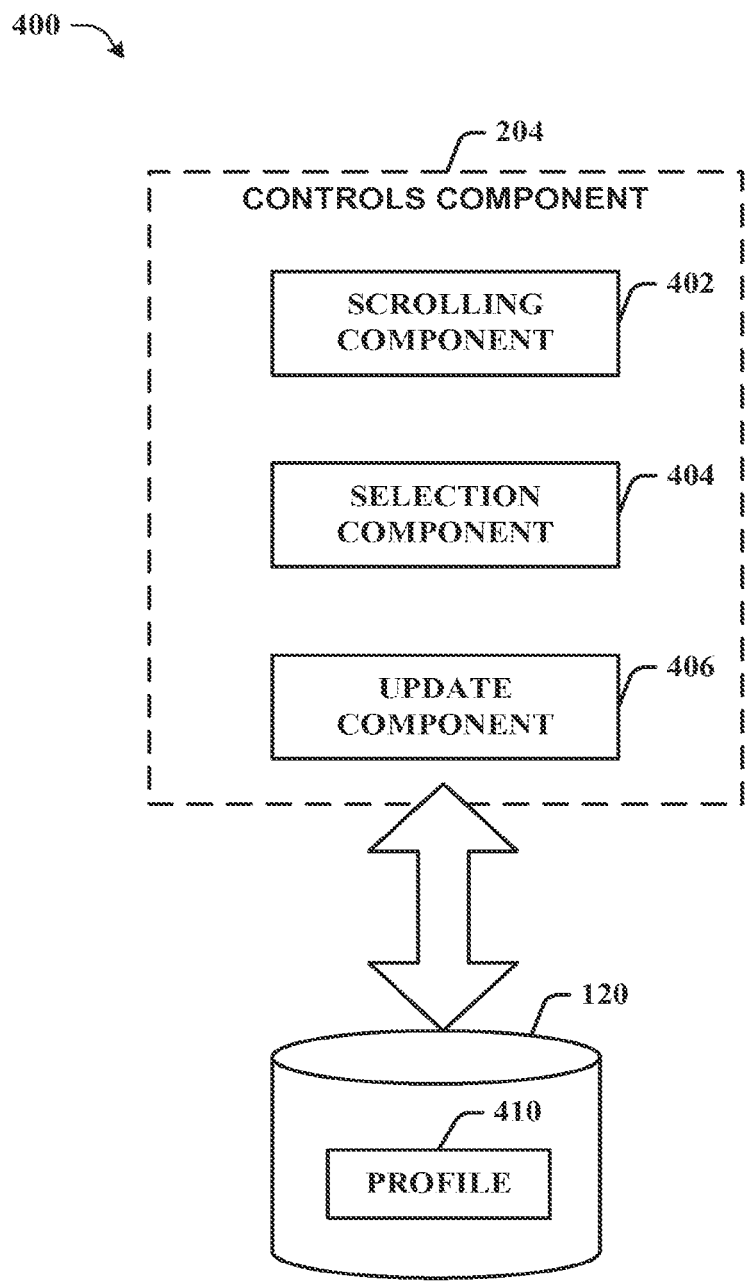
FIG. 4 illustrates an example controls component in accordance with various aspects described in this disclosure.

FIG. 4 illustrates an example controls component 204 in accordance with various aspects described in this disclosure. As discussed, the controls component 204 provides various adapters, connectors, channels, communication paths, etc., that provide for interaction with a pivot menu. The controls component 204 in FIG. 4 includes a scrolling component 402, a selection component 404, and an update component 406. The scrolling component 402 provides for users to move, progress, or otherwise scroll through menu items included in a level of the pivot menu. For example, in one embodiment, a related content level of the pivot menu can include a set of internet videos that are related to content (related videos) being consumed (discussed in greater detail with reference to FIGS. 3 and 7). For instance, the related videos can be displayed adjacent to one another in the pivot menu, and a user can scroll through the videos using, for example, a touch screen (e.g., swiping) or keyboard (e.g., arrow commands).

The selection component 404 provides for users to choose, execute, or otherwise select menu items included in a level of the pivot menu. For example, in one embodiment, a user can scroll through a set of videos (or playlists, channels, etc.) using a first set of inputs (e.g., keyboard arrow commands), and play a video in the set of videos using a different input (e.g., enter command). In addition, the selection component 404 initiates execution of a selected menu item. For instance, the selection component 404 initiates playback of selected content (e.g., using the playback component 112). The update component 406 adjusts, modifies, or otherwise updates a set of preferences associated with the user based on selections made by, and/or ratings provided (e.g., using the info component 304) by the user. For example, in one embodiment, the set of user preferences are maintained in a profile 410 associated with the user. A levels component 208 may use the set of user preferences to populate, update, or otherwise generate levels of the pivot menu (discussed in greater detail with reference to FIG. 3). For example, in one embodiment, the user may disapprove of, or provide negative feedback regarding, a first playlist, and the levels component 208 may not include the first playlist, and/or additional playlists related to the first playlist, in a playlist level of the pivot menu. It is to be appreciated that although the profile 410 is illustrated as being included in a data store 120, such implementation is not so limited. For example, the profile 410 can be included in a media component 102, a user device 110, and/or in another location, wherein the update component 406 may access the profile 410, e.g., via a network connection.

Figure 5:
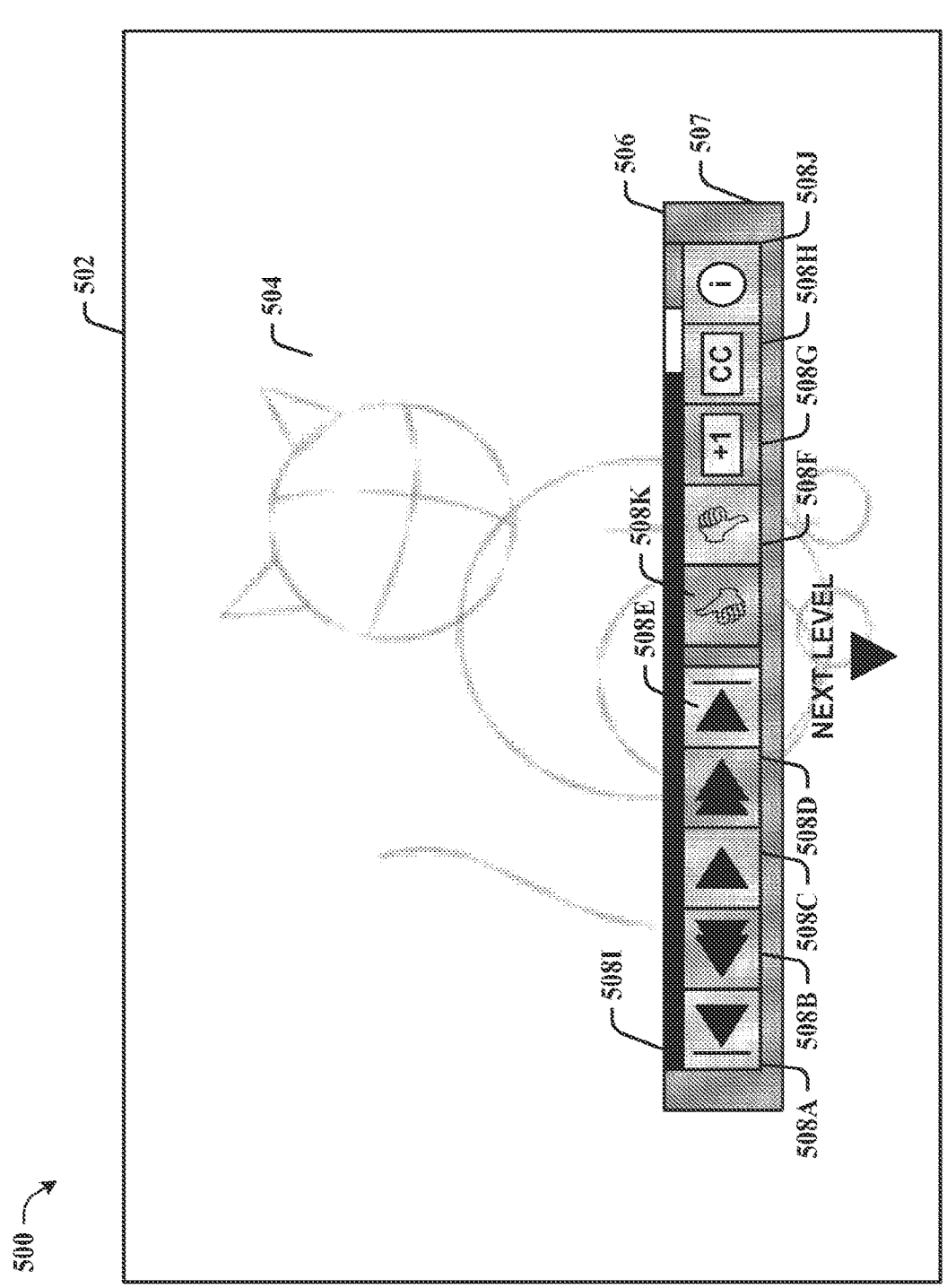
FIG. 5-7 illustrate a system that provides a non-limiting example of a adaptive content control and display for internet media in accordance with various aspects described in this disclosure.
Figure 6:
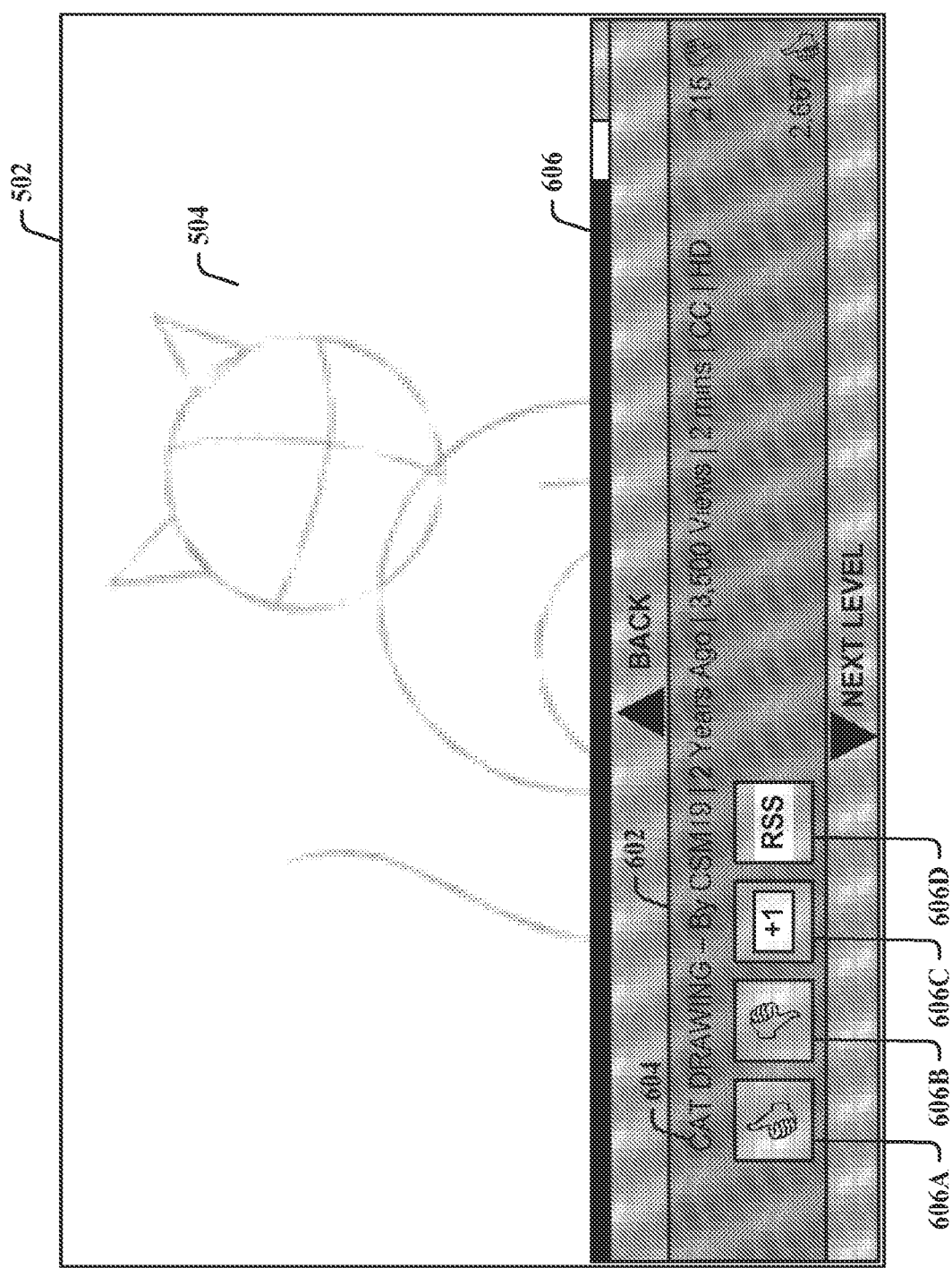
Figure 7:
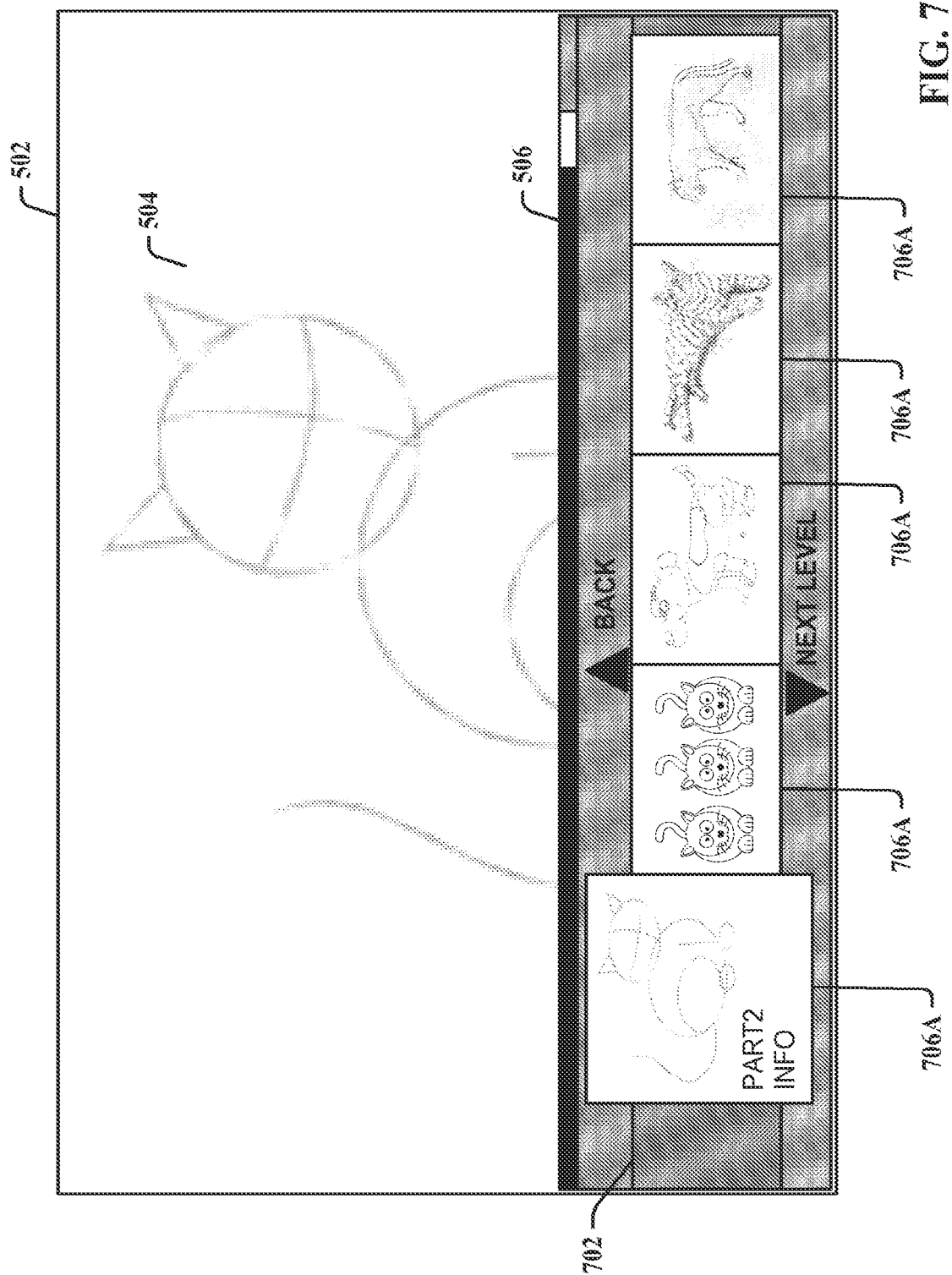

FIGS. 5-7 illustrate a system 500 that provides non-limiting examples of adaptive content control and display for internet media in accordance with various aspects described in this disclosure. The system 500 includes a media display window 502. The media display window 502 provides for playback of content 504 (e.g., using the media component 102). For example, in one embodiment, the content 504 includes a streaming internet video (e.g., using the media component 102). In response to a user input being detected (e.g., using the input component 114), a next level of a pivot menu 506 is displayed during playback of the content 504. If the pivot menu 506 was not being displayed prior to the user input being detected, then the next level of the pivot menu 506 can include a first level of the pivot menu 506. For instance, when a user enters a first keyboard command (e.g., a down arrow), a media player controls level 507 (a first level or a player controls level) of the pivot menu 506 can be displayed.

The player controls level 507 includes a set of player controls (e.g., 508A-K) that provide for the user to direct, instruct, or otherwise control playback of the content 504. The set of player controls can include but are not limited to rewind to the beginning 508A of content 504, fast rewind 508B, pause or play 508C, fast forward 508D, forward to the end 508E of the content 504, approve 508K of the content 504, disapprove 508F of the content 504, provide positive feedback 508G (e.g., +1™, etc) via a social network, view closed captioning 508H, a time slider 508I, and/or view additional information 508J regarding the content 504. The pivot menu 506 is displayed on top, or in front, of a portion of the content 504 during playback, and the pivot menu 506 is partially transparent to enable consumption of the content 504 to continue without complete obstruction. Aspects of the invention are not limited to a particular display of the pivot menu. For example, the pivot menu can be displayed adjacent to the content 504 during playback.

As discussed, in response to a user input being detected (e.g., using the input component 114), a next level of a pivot menu 506 is displayed during playback of the content 504. For example, in one embodiment, in response to the first user input (e.g., a down arrow command) being detect again, the next level of the pivot menu is displayed. The next level of the pivot menu 506 in FIG. 6 includes an information and ratings level 602. The information and ratings level 602 includes information 604 about the content 504 (e.g., title, author, age, views, duration, attributes, approvals, disapprovals, etc.), and provide a set of ratings controls (e.g., 606A-D) (e.g., using the info component 304). The ratings controls can include but are not limited to approve 606A of the content 504, disapprove 606B of the content 504, social networking actions 606C (e.g., +1™, comment, share, etc), and/or subscribe 606D (RSS) to the content, author, playlist, and/or channel.

The next level of the pivot menu 506 in FIG. 7 includes a related media level 702 (e.g., using the related media component 306). The related media level 702 includes a set of content (e.g., 704A-702E) that satisfies a set of relatedness criteria with regard to the content 504. The set of relatedness criteria can include but is not limited to satisfying a set of user preferences, satisfying a predetermined relatedness threshold (e.g., relatedness of 75%), and/or satisfying a predetermined relatedness ranking threshold (e.g., top 5, top 10, etc.). The related media level 702 provides for a user to take one or more actions regarding content in the set of content. For example, in one embodiment, the actions include but are not limited to consume the content, rate the content, add the content to favorites, block the content, and/or view additional information regarding the content. As an additional or alternative example, in one embodiment, a next level of the pivot menu 506 can include a playlist level or a channel level (discussed in greater detail with reference to FIG. 3). Aspects of the invention are not limited to a particular quantity or display of the menu items, or an order of the levels of the pivot menu 506. For example, different types and quantities of menu items can be included. As an additional or alternative example, the levels of the pivot menu 506 can be provided in a different order.

Figure 8:
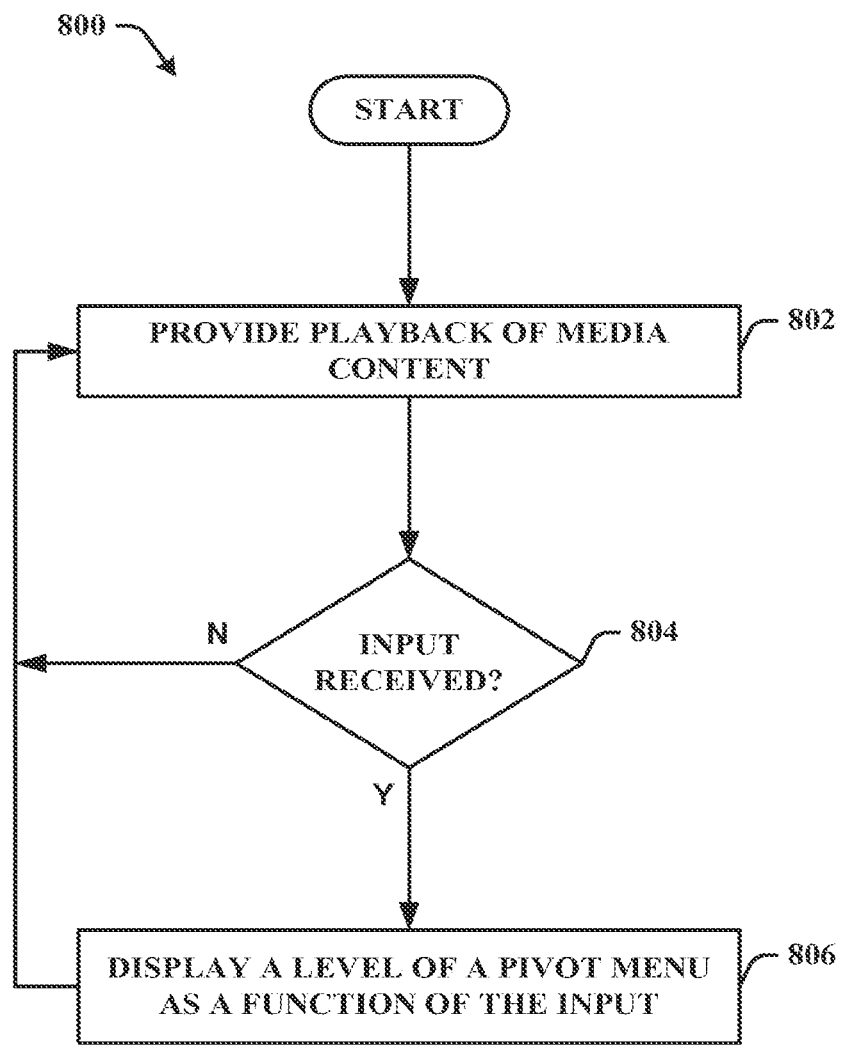
FIGS. 8-9 are example flow diagrams of respective methods for adaptive content control and display in accordance with various aspects described in this disclosure.
Figure 9:
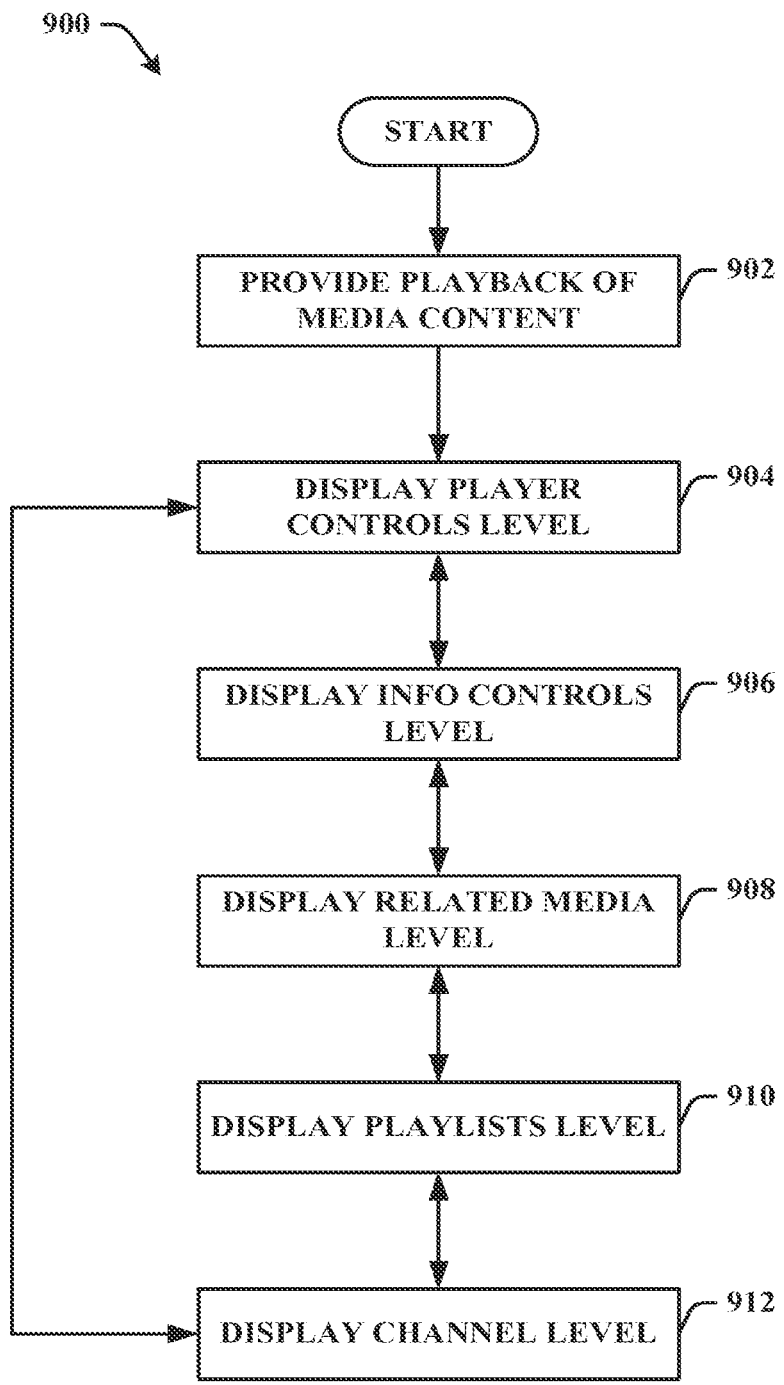

Non-Limiting Examples of Methods for Adaptive Content Control and Display for Internet Media FIGS. 8-9 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 8, illustrated is an example methodology 800 for adaptive content control and display for internet media in accordance with various aspects described in this disclosure. At reference numeral 802, playback of media content is provided (e.g., using the media component 102 or playback component 112). Playback of media content includes publishing, streaming, playing, displaying, or otherwise providing media content to a user. For example, in one implementation, the media content is provided to a user device associated with the user, for example, via a network connection. The content includes but is not limited to videos, music, electronic books (e-books), video games, websites, and/or articles. The user device can include but is not limited to a smart phone, a cell phone, a personal digital assistant (PDA), a tablet, a laptop, a desktop, a portable music player, a video game system, an electronic reader (e-reader), a global positioning system (GPS), a set-top box, and/or a television.

At reference numeral 804, a determination is made whether a user input has been received (e.g., using the input component 114) during playback of the content. The input can include explicit user inputs (e.g., configuration selections, question/answer, etc.) such as from mouse selections, keyboard entries, touch screen selections, and/or speech. At reference numeral 806, if it is determined that the user input has been received (Y at reference numeral 804), then a level of a pivot menu is displayed as a function of the user input (e.g., using the menu component 116), and playback of the content continues at reference numeral 802. For example, in one implementation, a next level of a pivot menu can be displayed in response to a first user input (e.g., a down arrow command), and a previous level of a pivot menu can be displayed in response to a second user input (e.g., an up arrow command). Additionally or alternatively, the pivot menu can be exited, closed, or otherwise not displayed in response to third user input (e.g., an ESC command). If the pivot menu was not previously being displayed, then the next level of the pivot menu can include a first level of the pivot menu.

The pivot menu is displayed while playback of the content continues, such that the content can still be consumed. For example, in one embodiment, the pivot menu can be displayed on top, or in front, of a portion of the content during playback, and the pivot menu can be at least partially transparent to enable consumption of the content to continue without complete obstruction. Returning to reference numeral 804, if it is determined that a user input has not been received (N at reference numeral 804), then the methodology returns to reference numeral 802.

FIG. 9 illustrates an example methodology 900 for adaptive content control and display for internet media in accordance with various aspects described in this disclosure. At reference numeral 902, playback of media content is provided (e.g., using the media component 102 or playback component 112). Playback of media content includes publishing, streaming, displaying, playing, or otherwise providing media content to a user. At reference numeral 904, in response to a first user input being received, a player controls level (e.g., first level) of a pivot menu is provided (e.g., using the player controls component 302) during playback of the content. The player controls level includes a set of media player controls (controls). The set of controls can include but are not limited to rewind to the beginning of content, fast rewind, pause, play, fast forward, forward to end of content, approve the content, disapprove of the content, and/or view additional information regarding content being consumed.

At reference numeral 906, in response to the first user input being received a second time, an information and ratings level (e.g., a second level) is displayed (e.g., using the info component 304). The information and ratings level provides a set of ratings controls that enable the user to rate content, authors, playlists, and/or channels, and information regarding the content being consumed to the user. The ratings controls can include but are not limited to approve the content, disapprove of the content, a set of social networking actions (e.g., +1™, etc), rate the content 104 using a predetermined scale (e.g., percentage, stars, etc.), block the content 104, and/or subscribe to the content, author, playlist, and/or channel. The information can include but is not limited to title, author, age, views, duration, attributes, quantity of approvals received, and/or quantity of disapprovals received.

At reference numeral 908, in response to the first user input being received a third time, a related media level (e.g., a third level) is displayed (e.g., using the related media component 306). The related media level includes a set of content related to the content being consumed (related content). For example, in one embodiment, content is selected from a set of content that satisfies a set of relatedness criteria (e.g., using the related media component 306). The set of relatedness criteria can include but is not limited to satisfying a set of user preferences, satisfying a user rating threshold, satisfying a predetermined relatedness threshold (e.g., relatedness of 75%), and/or satisfying a predetermined relatedness ranking threshold (e.g., top 5,top 10, etc.).

At reference numeral 910, in response to the first user input being received a fourth time, a playlist level (e.g., fourth level) of the pivot menu is displayed (e.g., using the playlist component 308). The playlist level includes a set of content included in a playlist associated with the content being consumed, and/or a set of playlists related to the content being consumed. For example, in one embodiment, a playlist associated with the content being consumed (associated playlist) is determined, and a set of content included in the associated playlist is included in the playlist level (e.g., using the playlist component 308). As an additional or alternative example, in one embodiment, a set of playlists related to and/or associated with the content being consumed (related playlists) are determined based on a set of playlist relatedness criteria, and the related playlists are included in the playlist level (e.g., using the playlist component 308). The set of playlists relatedness criteria includes but is not limited to association with the content being consumed, inclusion of the content being consumed, satisfying a set of user preferences, satisfying a predetermined playlist relatedness threshold (e.g., relatedness of 75%), and/or satisfying a predetermined playlist relatedness ranking threshold (e.g., top 5, top 10, etc.).

At reference numeral 912, in response to the first user input being received a fifth time, a channel level (e.g., a fifth level) of the pivot menu is displayed (e.g., using the channel component 310). The channel level includes a set of channels related to, and/or associated with, the content being consumed (related channels). For example, in one embodiment, a set of channels satisfying a set of channel relatedness criteria are determined, and included in the channel level (e.g., using the channel component 310). The set of channel relatedness criteria can include but is not limited to association with the content being consumed, inclusion of the content being consumed, satisfying a set of user preferences, satisfying a predetermined channel relatedness threshold (e.g., relatedness of 75%), and/or satisfying a predetermined channel relatedness ranking threshold (e.g., top 5, top 10, etc.).

Aspects of the invention are not limited to an order of the levels of the pivot menu, or the user inputs received. For example, in response to a second user input being received during playback of the content, a previous level of the pivot menu can be displayed, and in response to a third user input being received, the pivot menu can be closed, exited, or otherwise not displayed. For instance, if the channel level is being displayed, in response to receiving the second user input, the playlist level can be displayed.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 10:
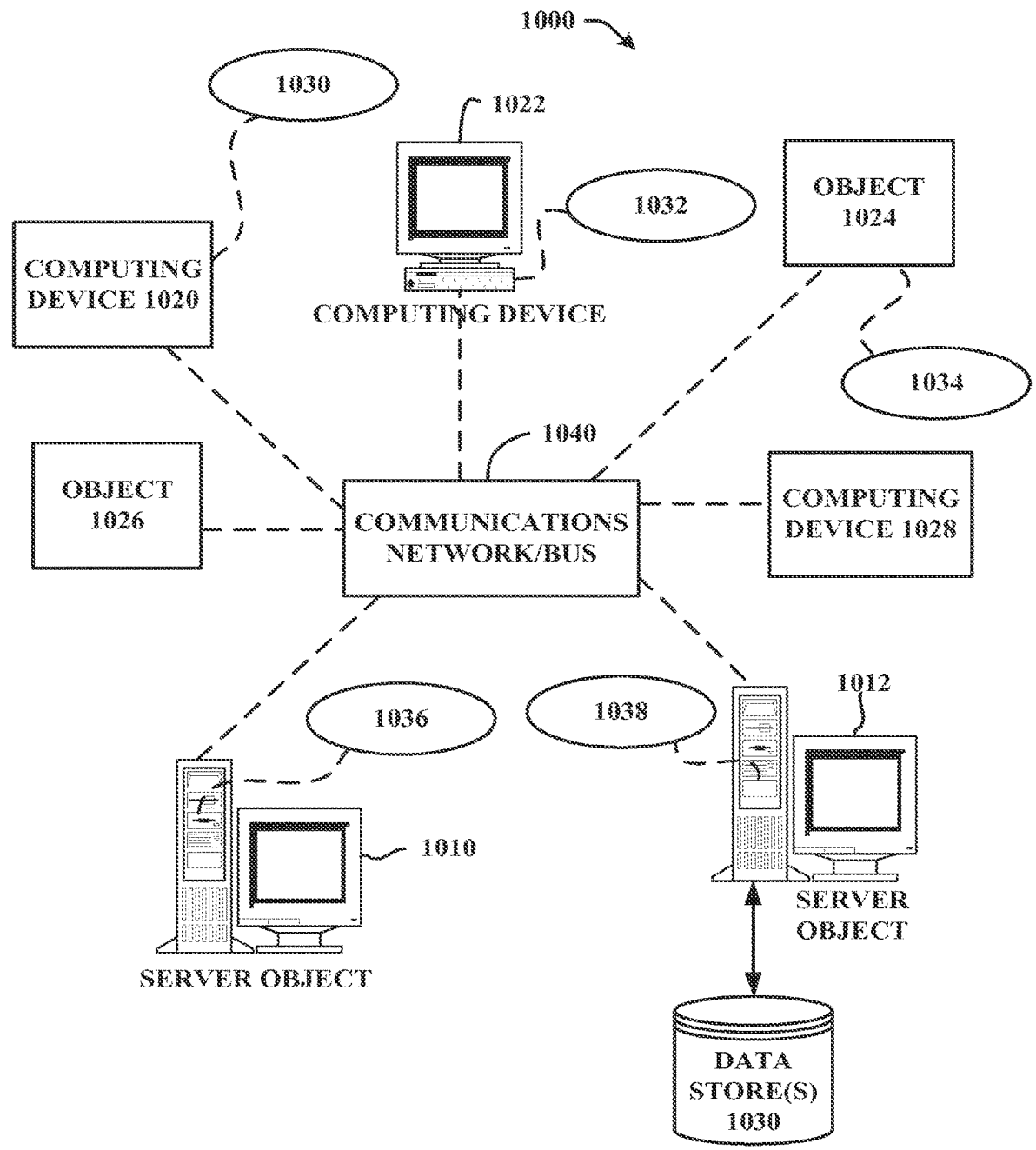
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 11:
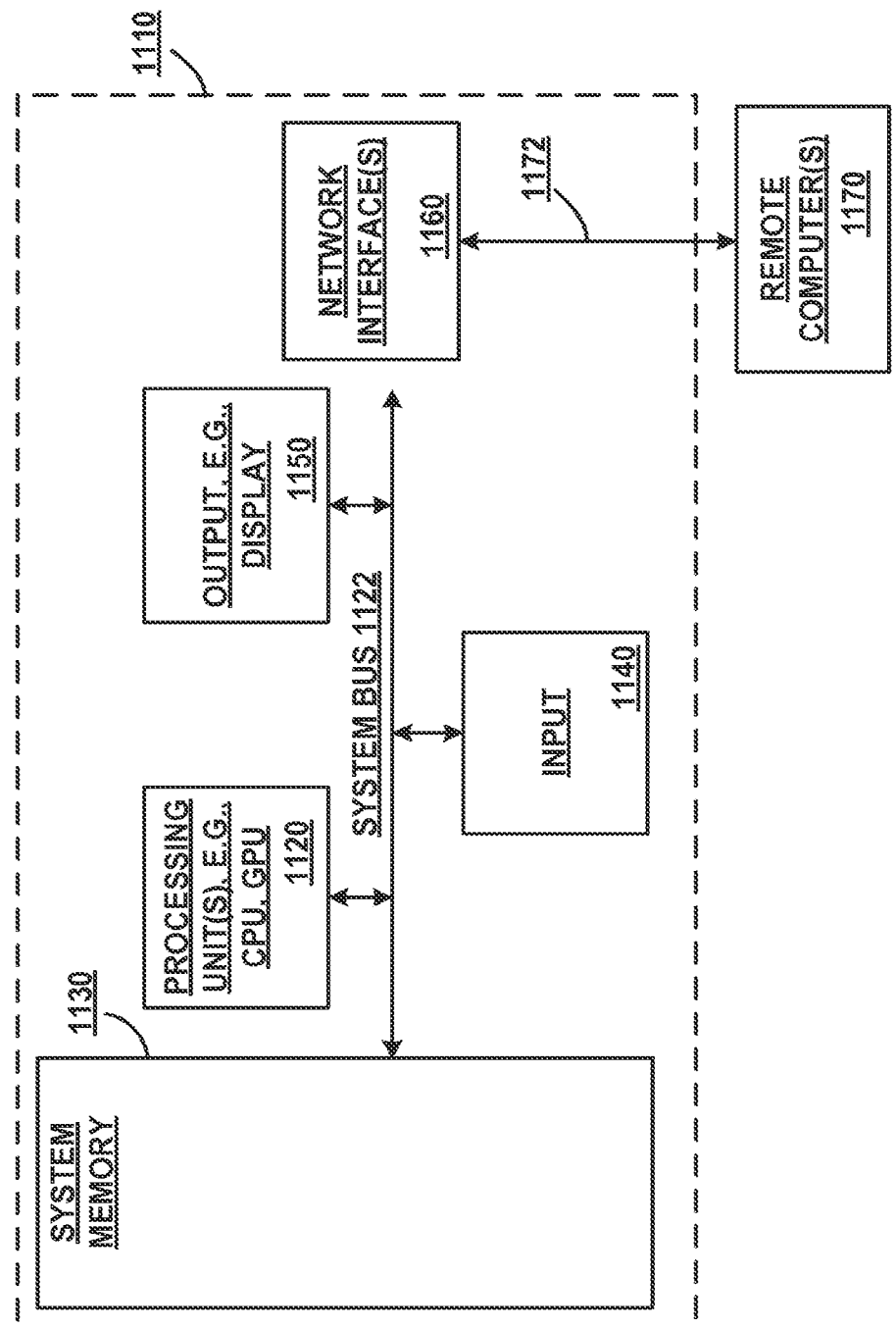
FIG. 11 is a block diagram representing an exemplary non-limiting computing system or operating environment in which the various embodiments may be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. Furthermore, reference throughout this disclosure to "one implementation" or "an implementation" or "one embodiment" or "an embodiment" means that a particular feature, structure, or characteristic described in connection with the implementation or embodiment is included in at least one implementation or embodiment. Thus, the appearances of the phrase "in one implementation" or "in an implementation" or "in one embodiment" or "in an embodiment" in various places throughout this specification are not necessarily all referring to the same implementation or embodiment.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
 a memory storing computer executable instructions; and
 a processor that, when executing the computer executable instructions stored in the memory, is configured to:
  cause a media content item to be played back;
  determine, based on relatedness criteria, a plurality of media content items related to the media content item, a plurality of playlists of media content items related to the media content item, and a plurality of channels of media content items related to the media content item; and
  cause a pivot menu to be presented that includes a plurality of levels comprising a related content level, a player control level, a playlist level, and a channel level, wherein:
   the related content level of the pivot menu includes at least a portion of the plurality of media content items,
   the player control level of the pivot menu includes a plurality of player controls that control playback of the media content item,
   the playlist level of the pivot menu includes at least a portion of the plurality of playlists,
   the channel level of the pivot menu includes at least a portion of the plurality of channels,
   each level of the pivot menu includes a progress bar that indicates the progress of the media content item,
   a first level of the plurality of levels of the pivot menu is presented in response to receiving a first command during the playback of the media content item, wherein the presentation of the pivot menu was inhibited prior to receiving the first command, and
   a second level of the plurality of levels of the pivot menu is presented in response to receiving a second command during the presentation of the first level of the pivot menu, wherein the second level of the pivot menu is a next level of the pivot menu relative to the level of the pivot menu when the second command is received.

2. The system of claim 1, wherein the first command corresponds to a first user input type and wherein the second command corresponds to the first user input type.

3. The system of claim 2, wherein the processor is further configured to:
 receive a third command during the playback of the media content item, wherein the third command corresponds to a second user input type; and
 in response to the third command, cause a third level of the pivot menu to be presented during the playback of the media content item, wherein the third level is a previous level of the pivot menu relative to a level of the pivot menu displayed when the third command is received.

4. The system of claim 1, wherein the plurality of player controls include controls to pause playback of the media content item, rewind the media content item, and fast forward the media content item.

5. The system of claim 1, wherein the relatedness criteria further comprises determining whether each of the plurality of media content items satisfies a defined numerical relatedness threshold.

6. The system of claim 1, wherein at least one of the plurality of channels included in the channel level includes a second plurality of media content items, wherein the second plurality of media content items includes the media content item that is being played back.

7. The system of claim 1, wherein at least one of the plurality of playlists included in the playlist level includes a second plurality of media content items, wherein the second plurality of media content items includes the media content item that is being played back.

8. A method, comprising:
 causing, using a hardware processor, a media content item to be played back;
 determining, using the hardware processor, based on relatedness criteria, a plurality of media content items related to the media content item, a plurality of playlists of media content items related to the media content item, and a plurality of channels of media content items related to the media content item; and
 causing, using the hardware processor, a pivot menu to be presented that includes a plurality of levels comprising a related content level, a player control level, a playlist level, and a channel level, wherein:
  the related content level of the pivot menu includes at least a portion of the plurality of media content items,
  the player control level of the pivot menu includes a plurality of player controls that control playback of the media content item,
  the playlist level of the pivot menu includes at least a portion of the plurality of playlists,
  the channel level of the pivot menu includes at least a portion of the plurality of channels,
  each level of the pivot menu includes a progress bar that indicates the progress of the media content item,
  a first level of the plurality of levels of the pivot menu is presented in response to receiving a first command during the playback of the media content item, wherein the presentation of the pivot menu was inhibited prior to receiving the first command, and
  a second level of the plurality of levels of the pivot menu is presented in response to receiving a second command during the presentation of the first level of the pivot menu, wherein the second level of the pivot menu is a next level of the pivot menu relative to the level of the pivot menu when the second command is received.

9. The method of claim 8, wherein the first command corresponds to a first user input type and wherein the second command corresponds to the first user input type.

10. The method of claim 9, wherein the method further comprises:
   receiving a third command during the playback of the media content item, wherein the third command corresponds to a second user input type; and
   in response to the third command, causing a third level of the pivot menu to be presented during the playback of the media content item, wherein the third level is a previous level of the pivot menu relative to a level of the pivot menu displayed when the third command is received.

11. The method of claim 8, wherein the plurality of player controls include controls to pause playback of the media content item, rewind the media content item, and fast forward the media content item.

12. The method of claim 8, wherein the relatedness criteria further comprises determining whether each of the plurality of media content items satisfies a defined numerical relatedness threshold.

13. The method of claim 8, wherein at least one of the plurality of channels included in the channel level includes a second plurality of media content items, wherein the second plurality of media content items includes the media content item that is being played back.

14. The method of claim 8, wherein at least one of the plurality of playlists included in the playlist level includes a second plurality of media content items, wherein the second plurality of media content items includes the media content item that is being played back.

15. A non-transitory computer-readable medium containing computer executable instructions that, when executed by a processor, cause the processor to perform a method, the method comprising:
   causing a media content item to be played back;
   determining, based on relatedness criteria, a plurality of media content items related to the media content item, a plurality of playlists of media content items related to the media content item, and a plurality of channels of media content items related to the media content item; and
   causing a pivot menu to be presented that includes a plurality of levels comprising a related content level, a player control level, a playlist level, and a channel level, wherein:
      the related content level of the pivot menu includes at least a portion of the plurality of media content items,
      the player control level of the pivot menu includes a plurality of player controls that control playback of the media content item,
      the playlist level of the pivot menu includes at least a portion of the plurality of playlists,
      the channel level of the pivot menu includes at least a portion of the plurality of channels,
      each level of the pivot menu includes a progress bar that indicates the progress of the media content item,
      a first level of the plurality of levels of the pivot menu is presented in response to receiving a first command during the playback of the media content item, wherein the presentation of the pivot menu was inhibited prior to receiving the first command, and
      a second level of the plurality of levels of the pivot menu is presented in response to receiving a second command during the presentation of the first level of the pivot menu, wherein the second level of the pivot menu is a next level of the pivot menu relative to the level of the pivot menu when the second command is received.

16. The non-transitory computer-readable medium of claim 15, wherein the first command corresponds to a first user input type and wherein the second command corresponds to the first user input type.

17. The non-transitory computer-readable medium of claim 16, wherein the method further comprises:
   receiving a third command during the playback of the media content item, wherein the third command corresponds to a second user input type; and
   in response to the third command, causing a third level of the pivot menu to be presented during the playback of the media content item, wherein the third level is a previous level of the pivot menu relative to a level of the pivot menu displayed when the third command is received.

18. The non-transitory computer-readable medium of claim 15, wherein the plurality of player controls include controls to pause playback of the media content item, rewind the media content item, and fast forward the media content item.

19. The non-transitory computer-readable medium of claim 15, wherein the relatedness criteria further comprises determining whether each of the plurality of media content items satisfies a defined numerical relatedness threshold.

20. The non-transitory computer-readable medium of claim 15, wherein at least one of the plurality of channels included in the channel level includes a second plurality of media content items, wherein the second plurality of media content items includes the media content item that is being played back.

21. The non-transitory computer-readable medium of claim 15, wherein at least one of the plurality of playlists included in the playlist level includes a second plurality of media content items, wherein the second plurality of media content items includes the media content item that is being played back.

\* \* \* \* \*